United States Patent [19]

Morehouse et al.

[11] 4,331,991
[45] May 25, 1982

[54] HEAD ACTUATOR FOR MAGNETIC DISK DRIVE

[75] Inventors: James H. Morehouse, Jamestown; Mark A. Swenson, Broomfield, both of Colo.

[73] Assignee: Storage Technology Corporation, Louisville, Colo.

[21] Appl. No.: 165,298

[22] Filed: Jul. 2, 1980

[51] Int. Cl.³ .......................... G11B 5/55; G11B 21/08
[52] U.S. Cl. ..................................................... 360/106
[58] Field of Search ............... 360/104, 105, 106, 107, 360/82, 86, 136

[56] References Cited

U.S. PATENT DOCUMENTS

| | | | |
|---|---|---|---|
| 3,735,163 | 5/1973 | Dijkstra | 360/106 |
| 4,145,725 | 3/1979 | Wallis | 360/106 |
| 4,150,407 | 4/1979 | Dijkstra | 360/106 |
| 4,196,456 | 4/1980 | Manzke | 360/106 |

Primary Examiner—Robert M. Kilgore
Attorney, Agent, or Firm—Woodcock, Washburn, Kurtz, Mackiewicz & Norris

[57] ABSTRACT

An actuator for the head assembly of a magnetic disk drive includes a magnet having a curved surface mounted along the arc of rotation of a movable coil. Magnets on three sides of the coil increase the torque of the actuator. The curved surface magnet has a flat surface opposite thereto and disposed against the actuator housing.

9 Claims, 6 Drawing Figures

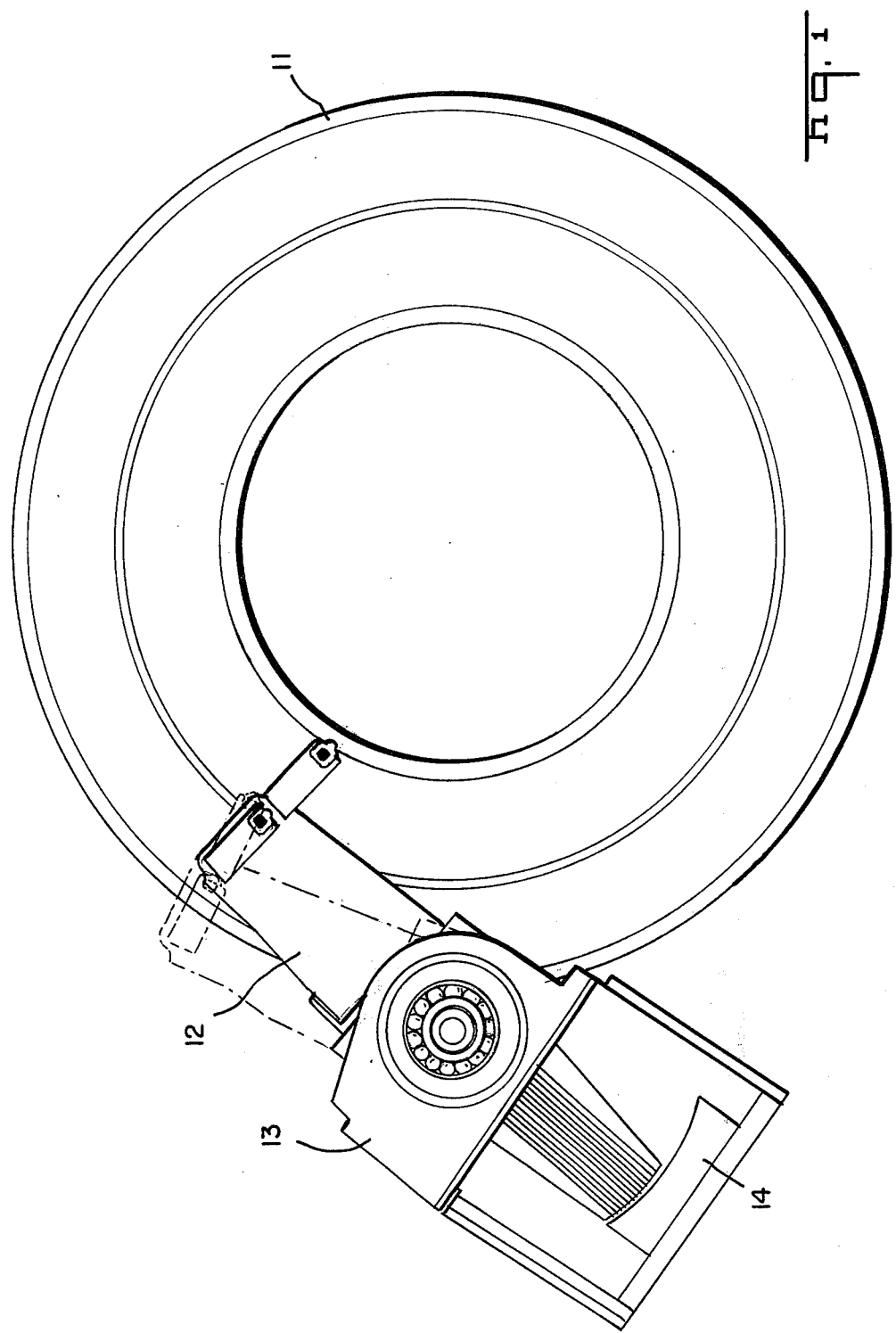

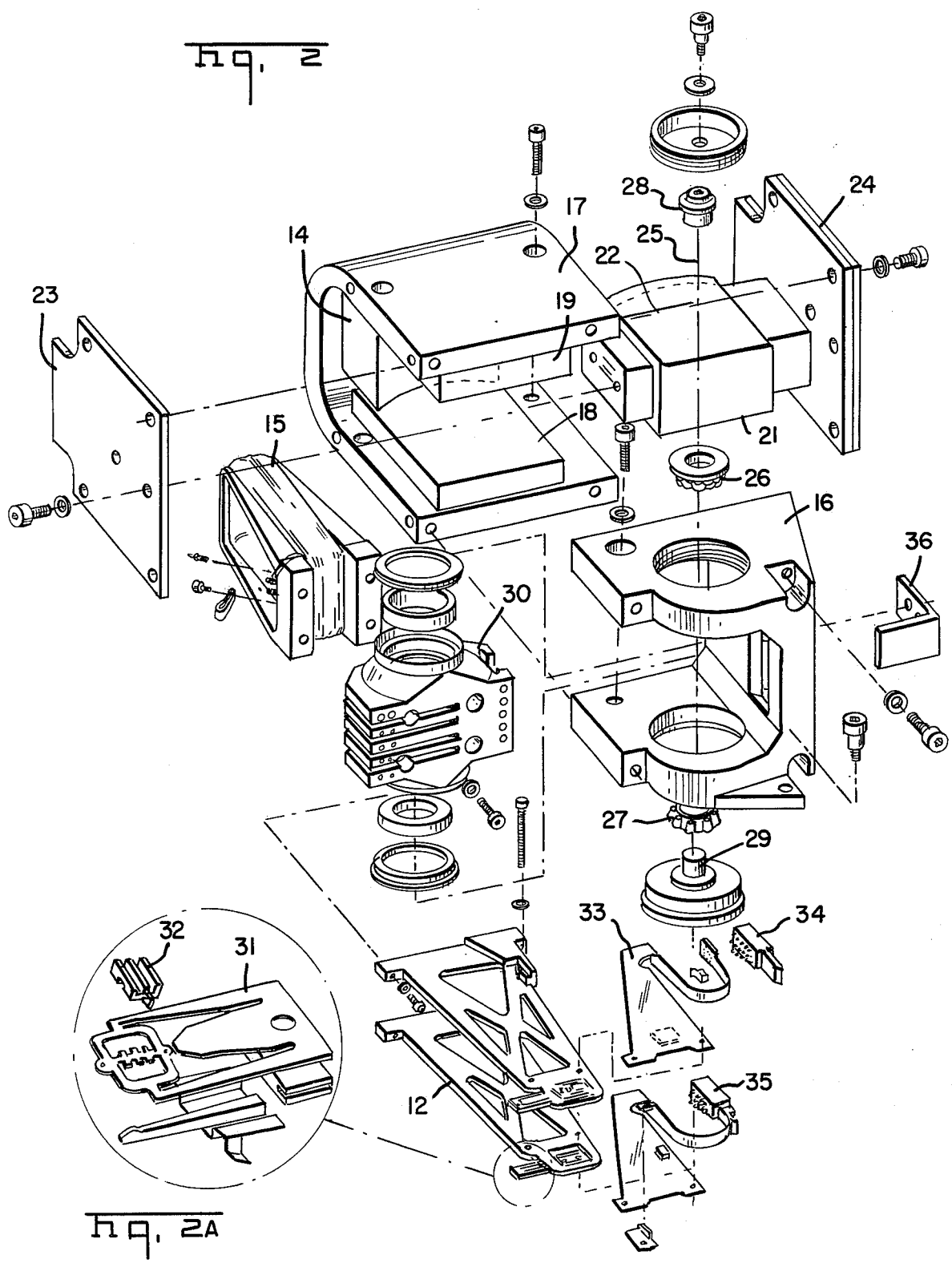

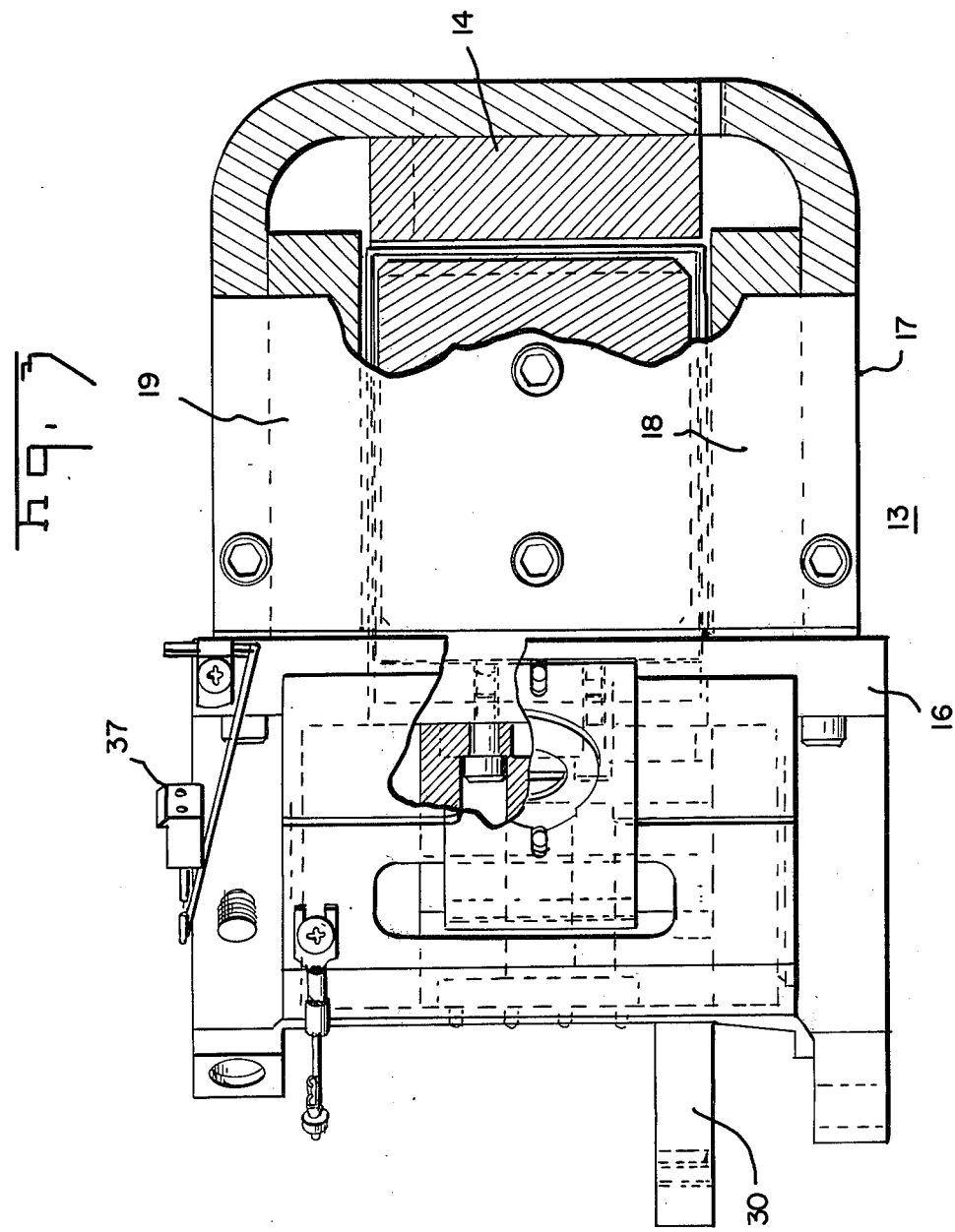

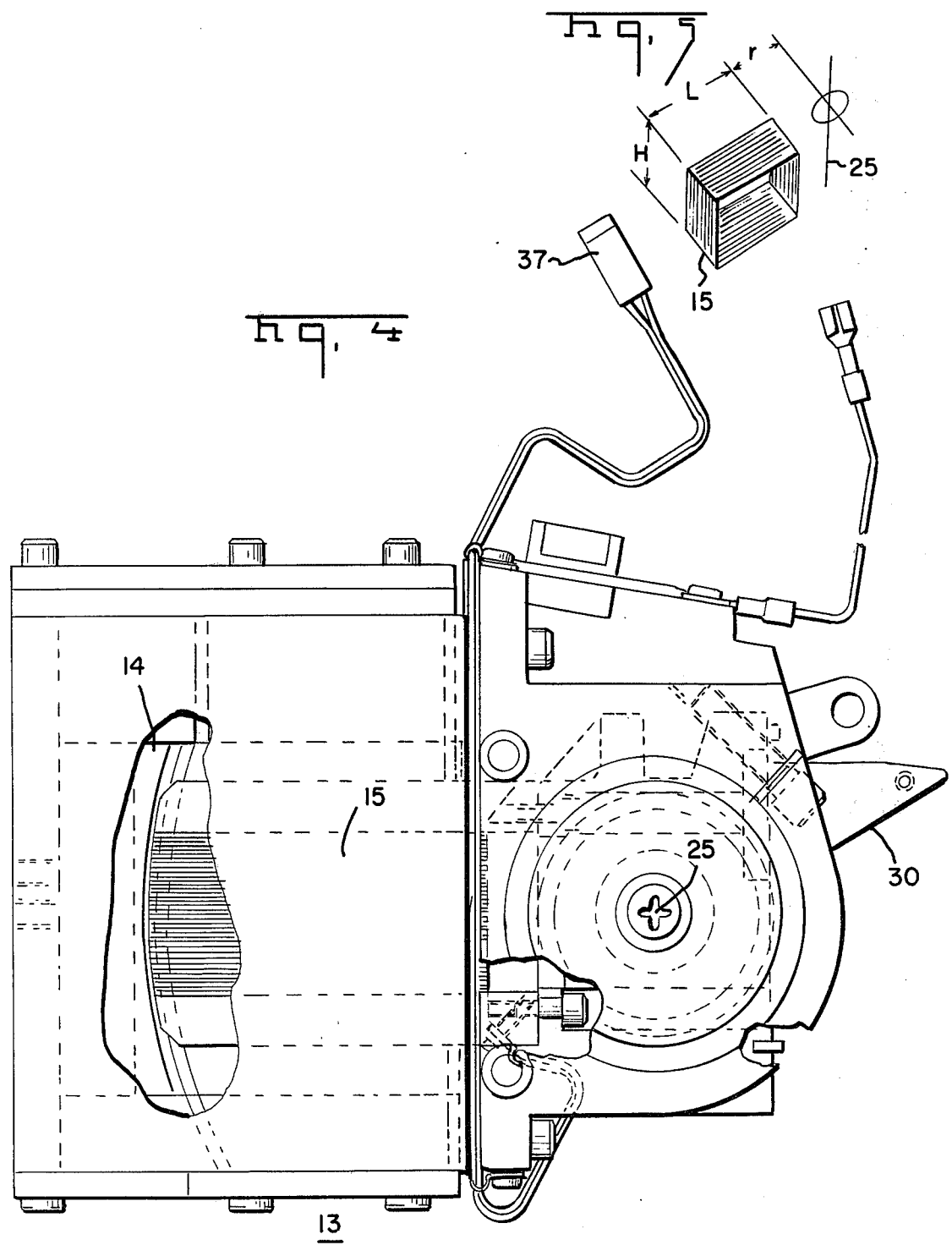

HEAD ACTUATOR FOR MAGNETIC DISK DRIVE

BACKGROUND OF THE INVENTION

This invention relates to magnetic disk drives and particularly to an actuator for moving the magnetic heads into position for reading from or writing on a magnetic disk.

Magnetic disk units are extensively used in computer systems. Large magnetic disk units generally have a magnetic read/write assembly which is moved radially from track to track across the magnetic disk. Recently, many small magnetic disk drives have employed an actuator which moves the heads in an arc across the magnetic disks, much in the manner of a phonograph arm moving across a record. An example of this type of drive is IBM System 32 and comparable magnetic disk drives made by other companies. These disk drives usually make use of a magnetic head which is referred to as "IBM/Winchester".

The actuator for these magnetic disk units includes a rotating coil which is coupled to the magnetic recording head assembly to position it with respect to the magnetic disk when the coil is energized. Permanent magnets are positioned on two sides (top and bottom) of the coil to cooperate with a pole piece in an assembly which produces the desired arcuate position when the coil is energized.

These rotary actuators use only two sides of their coil to produce torque. The side of the coil with the greatest lever arm is outside of the torque-producing magnetic air gap. For this reason, the prior art actuators do not maximize the torque available from a coil having a given number of windings.

It is an object of the present invention to provide an actuator having improved torque capability for a magnetic disk drive.

It is a further object of the present invention to provide an actuator which is easy to fabricate and cost-effective.

SUMMARY OF THE INVENTION

In accordance with the present invention, an actuator for the head assembly of a magnetic disk drive has magnets on three sides of the coil, thereby increasing the torque of the actuator. The magnet on the third side of the coil is positioned at the greatest radius from the actuator axis. This magnet creates a magnetic air gap in an arc which has a large lever arm. This improves the torque over that which would normally be produced without this added magnet.

Further in accordance with the invention, the magnet along the arc of rotation of the coil has a curved surface which conforms with that arc. This provides a narrow air gap between the magnet and the coil thereby maximizing magnetic flux density. Further, this magnet is flat on the other side, thereby allowing the magnet to be easily fastened to the flat surface of the housing in which the magnets and coil are enclosed.

Further in accordance with the invention, the magnet disposed along the arc of rotation is thicker at the ends than in the middle. The magnets at the other two sides are uniform in thickness. The three magnets configured in this manner cooperate to produce a constant torque throughout the entire arc of rotation of the coil.

Further in accordance with the invention, iron side plates are fastened to the two open sides of a C-shaped housing which encloses the coil assembly and magnets. This provides an actuator with very low magnetic flux leakage and efficient torque-producing capability.

SHORT DESCRIPTION OF THE DRAWINGS

FIG. 1 is a top view of the actuator coupled to a magnetic head assembly which is positioned with respect to a magnetic disk;

FIG. 2 is an exploded view of the actuator;

FIG. 2A shows the head assembly in more detail;

FIG. 3 is a side view of the actuator;

FIG. 4 is a top view of the actuator; and

FIG. 5 is a view of the coil with dimensions useful in understanding the increased torque produced by the actuator of this invention.

DESCRIPTION OF THE PREFERRED EMBODIMENT

Referring to FIG. 1, a magnetic disk drive includes a stack of magnetic disks 11 which are rotated by a hub. A head arm assembly 12 is driven in an arc to position magnetic recording heads at the extremities thereof with respect to the magnetic disks. An actuator 13 drives the head arm assembly 12. The actuator contains a rotating coil which is coupled to the head arm assembly to move it in an arc. In accordance with the present invention, a magnet 14 is positioned at the rear of the actuator. The magnet 14 cooperates with magnets on both sides of the coil to produce torque on three sides of the coil. The magnet 14 has a curved surface which conforms with the arc of rotation of the coil, thereby providing a small air gap to maximize magnetic flux density.

This is better shown in FIG. 2, wherein the rotating coil 15 is mounted for rotation in the cradle 16 which is attached to the C-shaped housing 17. Flat, uniform thickness magnets 18 and 19 are disposed on the two arms of the C-shaped housing. The magnet 14 is disposed on the third side of the coil, and along the arc of rotation of the coil 15. A pole piece 21 having a curved surface 22 is disposed within an annular member. Iron side plates 23 and 24 are secured to the open sides of the C-shaped housing 17. This completes an assembly having very low magnetic leakage.

Coil assembly 20 rotates about the actuator axis 25 which passes through openings in both legs of the cradle 16. Bearings 26 and 27 are disposed within these openings to journal the upper shaft 28 and lower shaft 29. The actuator body 30 rotates on these shafts. The actuator body is connected to the coil 15 and is rotated by it when the coil is energized. Four head arm assemblies such as indicated at 12, are fastened to the actuator body. Each has head flexure assemblies 31 carrying magnetic recording heads 32. A flex circuit 33 is carried by the head arm assembly. Head connectors 34 and 35 provides the electrical connections.

A crash stop 36 is provided at both limits of arcuate travel of the actuator body and cradle.

As shown in FIG. 4, the plug 37 provides the electrical connection to the coil.

FIG. 5 shows the coil dimensions L and H, together with the radius r at which the coil 15 is disposed from the actuator axis 25. The following analysis of these dimensions is useful in demonstrating that placing the magnet 14 at the third side of the actuator greatly increases the torque produced by that actuator. The force F generated by a conductor of length L carrying a current I in a magnetic field B is given by:

$$\underline{F} = (\underline{B} \times \underline{I})L$$

The torque T is given by:

$$\underline{T} = \underline{F} \times \underline{r} = (\underline{B} \times \underline{I} \times \underline{r})L$$

The torque constant for a given coil is given by:

$$K_T = T/I = k\, B \Sigma L_i R_i$$

where $L_i$ is the length of each coil and $R_i$ is the radius of that length from the actuator axis.

This term includes the contribution from the top and bottom air gaps and the torque contribution from the rear air gap as follows:

$$\Sigma L_i R_i 32\ N[2L(r+L/2) + H(r+L)]$$

In the foregoing, the first term on the right-hand side is the contribution to torque from the air gap between the magnet 18 and the coil and the air gap between the magnet 19 and the coil. The second term on the right-hand side in the above equation is the contribution to torque from the air gap between the coil and the magnet 14 which is added in accordance with the present invention. In a typical configuration, L is 2.7 inches, H is 2.3 inches, and r is 1.625 inches. In this configuration, the air gap between the top and bottom magnets and the coil contributes 61.8% of the torque and the air gap between the rear curved magnet contributes 38.2% of the total generated torque. It can be seen that the torque contributed by the addition of the curved magnet 14 to the actuator is significant.

Three magnets have been shown on three sides of the coil. A single magnetic member extending on three sides of the coil could also be used. Various other modifications are within the true spirit and scope of the invention. The appended claims are, therefore, intended to cover all such modifications.

What is claimed is:

1. An actuator for the head assembly of a magnetic disk drive comprising:
    a rotating coil wound with at least three torque producing sides including a side along the extreme arc of rotation and coupled to said head assembly to position it with respect to a magnetic disk when the coil is energized;
    a housing within which said coil rotates; and
    a permanent magnetic member on three torque producing sides of said coil, including the side along the extreme arc of rotation of said coil, thereby increasing the torque of said actuator.

2. The actuator recited in claim 1 wherein said magnetic member comprises:
    magnets on the two sides of said housing parallel to the plane of rotation of said coil; and
    a magnet at the side of said coil along the arc of rotation of said coil.

3. The actuator recited in claim 2 wherein said magnet along the arc of rotation of said coil has a curved surface which conforms with said arc of rotation.

4. The actuator recited in claim 3 wherein said magnet having a curved surface has a flat surface opposite thereto, said flat surface being disposed against said housing.

5. The actuator recited in claim 4 wherein said magnet having a curved surface is thicker at both ends than in the middle, and wherein said magnets on the two sides of said housing have uniform thickness whereby the increased thickness at the ends cooperate with the uniform thickness of said magnets at the sides to produce a substantially constant torque throughout the rotation of said coil.

6. The actuator recited in claim 1 wherein said housing is C-shaped, being open on the side at which said head assembly is coupled to said coil and being open on the two sides at the extremes of rotation of said coil.

7. The actuator recited in claim 6 further comprising magnetic side plates fastened at both of said open sides to minimize magnetic flux leakage from said actuator.

8. The actuator recited in claim 1 wherein said coil is wound on an annular member; and
    a magnetic pole piece disposed through the center of said annular member.

9. The actuator recited in claim 1 further comprising:
    a cradle connected to said housing;
    bearings journaled in openings in the top and bottom of said cradle;
    and a shaft for said coil positioned for rotation with the journaled bearings.

* * * * *